United States Patent
Kodim

[11] Patent Number: 6,094,190
[45] Date of Patent: Jul. 25, 2000

[54] DEVICE FOR CONTROLLING A POSITION INDICATOR ON A VISUAL DISPLAY

[75] Inventor: Walter Kodim, Nürnberg, Germany

[73] Assignee: Telefonaktiebolaget LM Ericsson, Stockholm, Sweden

[21] Appl. No.: 09/032,950

[22] Filed: Mar. 2, 1998

[30] Foreign Application Priority Data

Mar. 3, 1997 [DE] Germany ............................ 197 08 450

[51] Int. Cl.[7] .................................................. G09G 5/08
[52] U.S. Cl. ............................................. 345/167; 345/157
[58] Field of Search ..................................... 345/157, 156, 345/167, 163, 164, 165, 166, 168; 74/471; 364/558; 340/710

[56] References Cited

U.S. PATENT DOCUMENTS

| | | | |
|---|---|---|---|
| 4,823,634 | 4/1989 | Culver | 340/710 |
| 4,939,508 | 7/1990 | Lawrence et al. | 340/710 |
| 5,162,780 | 11/1992 | Solhjell . | |
| 5,287,089 | 2/1994 | Parsons | 345/156 |
| 5,379,053 | 1/1995 | Steinberg | 340/710 |
| 5,620,371 | 4/1997 | Blonder . | |
| 5,691,747 | 11/1997 | Amano | 345/167 |
| 5,717,610 | 2/1998 | Baba | 364/558 |

FOREIGN PATENT DOCUMENTS

| | | |
|---|---|---|
| 2012199 | 3/1991 | Canada . |
| 0 660 258 A2 | 6/1995 | European Pat. Off. . |
| 0 725 360 A1 | 8/1996 | European Pat. Off. . |
| 3045133A1 | 11/1980 | Germany . |
| 3912354A1 | 10/1990 | Germany . |
| 5-233142 | 9/1993 | Japan . |
| WO 94/22071 | 9/1994 | WIPO . |
| WO 95/00897 | 1/1995 | WIPO . |

*Primary Examiner*—Xiao Wu
*Attorney, Agent, or Firm*—Burns, Doane, Swecker & Mathis, L.L.P.

[57] ABSTRACT

For controlling a position indicator, e.g. a cursor, on a visual display, e.g. the monitor screen associated with a personal computer or a laptop computer screen, a position indicator controlling device (1) comprises an indicator position controller (6) in the form of a continuous membrane of elastomeric material (8) stretched, in wrinkle-free manner, around a solid form-keeping core (7) held captive in a housing (2) so that by applying finger pressure in a generally horizontal direction to an uppermost exposed, part-spheroidal, portion of the membrane, the membrane can slide on the core to produce a corresponding output signal from one or more motion detectors (11, 12). The indicator position controller gives the appearance to a user of a spherical ball device (such as is commonly used in a laptop computer), but the special shape of the form-keeping core is such as to reduce the overall height requirement and leads to a heightwise compact construction for the position indicator controlling device (1').

According to two modifications (FIGS. 5 and 6), the indicator position controller (6) is realized by a normally spheroidal thick-walled elastomeric ball (8'), or by a solid elastomeric ball (8") held in a deformed state by the housing (2). The position indicator controlling device (1) can be designed for use as a ball-type device for a laptop computer or as a mouse for a personal computer.

31 Claims, 5 Drawing Sheets

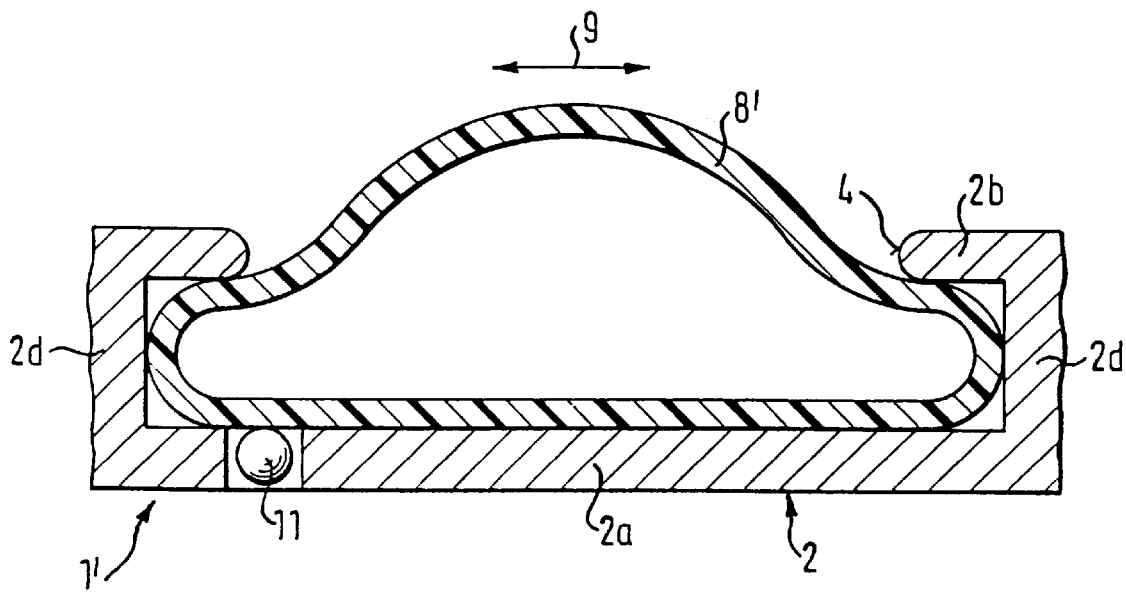
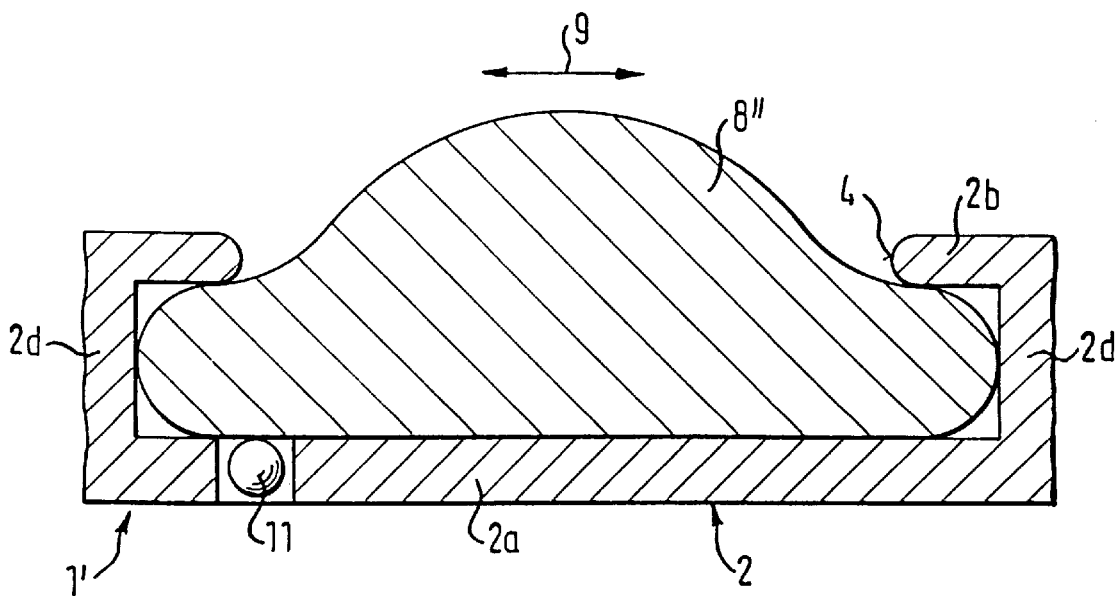

DEVICE FOR CONTROLLING A POSITION INDICATOR ON A VISUAL DISPLAY

FIELD OF THE INVENTION

The present invention relates to a device for controlling a position indicator on a visual display, comprising a housing, an indicator position controller held captive in the housing so as to expose a part-spheroidal portion of the position controller for enabling a user to rotate the same substantially about the centre of curvature of the centre-most exposed region of the part-spheroidal portion, and detector means for providing output signals dependent on the rotation of the part-spheroidal portion. Such a device is well known in the art, for example a mouse for controlling the position of a cursor or indicator on a display screen of a personal computer or a ball-type device for performing the same function for a laptop computer.

TECHNICAL BACKGROUND AND PRIOR ART

Various types of devices for manually controlling a position indicator on a visual display are known, e.g. keyboards or push button arrays. With the advent of electronic devices using display screens to inform the user and help him interact with the device, it has become important to provide control devices in which a high-lighted portion of the screen (e.g. cursor or pointer) can be manipulated, i.e. moved to a desired location on the screen. A well known device of this type is a mouse.

A mouse generally contains a ball that is rotatably supported in a housing where the moving of the housing by a user results in a rotation of the ball, because the ball is held in frictional contact with a ground surface underlying the housing. The rotation of the ball is detected by sensor elements that measure the rotation in two different directions. The movement of the ball in these two directions is then translated into a movement of the cursor or pointer on the two-dimensional display screen.

An input device that operates according to basically the same principle is the so-called track-ball. A track-ball also consists of a rotatable ball in a housing, where the rotation of the ball is detected, but the difference is that in the case of the track-ball, it is not the housing that is moved, but the ball itself, which is directly manipulated by the user. This has the advantage that no space is required for moving the mouse about. Consequently, such ball-type devices are preferred in devices where available space has to be economically used, i.e. especially in portable devices like laptop computers.

Reference is made to U.S. Pat. No. 4,939,508 which discloses a point and select device which can function either in a mouse or a track-ball mode according to whether the spherical ball thereof protrudes downwardly or upwardly from the casing of the point and select device.

Various techniques for measuring the rotational movement of the ball are known. One is to provide rollers that contact the ball, where the rollers are oriented to pick up different rotational directions of the ball. The rotation of the rollers is then evaluated, e.g. through optical measurement of scanning disks attached to the shafts on which the rollers are held.

It is also possible to provide an optical method of directly measuring the ball rotation in a compact mouse structure, as shown in WO-94/22071. According to this document, the ball is covered with a plurality of concave reflectors and thereby resembles a golf ball. Light sending and receiving means are provided around the ball, where the varying reflections from the ball are used to detect the ball's rotation. The ball is covered with a transparent layer to thereby be able to roll smoothly. A similar scheme is shown in DE-30 45 133 A1.

Furthermore, a system for the precise measurement of the rotated distance is known from DE-39 12 354 A1, wherein at least two permanent magnets are provided in the rotatable ball, where said magnets cross each other at a non-zero angle. At least two magnetic sensors, such as Hall sensors, are provided around the ball, to thereby measure the ball's rotation on the basis of the change in magnetic field.

The above-mentioned systems are wherein the cursor or pointer can be moved to any desired point on a screen to thereby choose an option associated with that point, where the user then has to actuate a button or key to thereby let the electronic device execute the selected option.

Reference is made to FIG. 1, which is a simplified, very diagrammatic, vertical sectional view through a typical known track-ball for a laptop computer. In this Figure, the track-ball 1 is held captive in any suitable manner, such as between socket members 3, such that it can be rotated in any direction by the user moving his finger or hand when in frictional contact with the upper spherical cap portion of the track-ball that is exposed to the user through a circular opening 4 in the upper side of a housing 2.

The rotation of the track-ball 1 about its axis normal to the plane of FIG. 1 is detected by means of rotation detector 5, which produces an output electrical signal dependent on the track-ball rotation that effects a corresponding displacement of the cursor or pointer along one axis on the display screen or the like. The rotation detector may comprise for example a roller that is in frictional contact with the outer spherical surface of the track-ball.

In addition, a further rotation detector (not shown) is arranged at an angular displacement of 90° typically, with respect to rotation detector 5 about the vertical axis in FIG. 1 passing through the centre of the track-ball. In this way, rotation of the track-ball in any direction is converted by one, the other, or both of the rotation detectors into corresponding output signals that control the motion of the cursor or pointer along one or the other of mutually perpendicular axes, i.e. x and y axes, or at an appropriate angle relative to these two axes.

From a consideration of FIG. 1, it will be appreciated that the bottom of the track-ball is in practice positioned a small distance above the base of the housing, this distance depending upon factors such as the housing design, possibly the space required by the rotation detector, etc. Thus, a track-ball of given size (diameter) will determine the overall height of the ball-type device. It will further be appreciated that because the portion of the track-ball that is exposed to the user must necessarily be less than 50% of the track-ball volume in order that it can be held captive in the housing, a given track-ball size determines a minimum height dimension for the housing. However, particularly where the control device is to be used with a laptop computer, where customer demand is for reduced space requirements, in particular lower height dimensions, a reduced height both for the overall height of the control device and the height dimension of its housing can only be achieved by reducing the diameter of the track-ball. Alternatively, some other form of control device altogether for adjusting the position of the cursor or pointer has to be devised.

As the track-ball size is reduced, the surface area exposed to the user becomes smaller and also its curvature becomes larger. Users prefer a track-ball that is at least of a certain minimum diameter, for ease of use and comfort. Therefore, in practice, there is a limit on how small the track-ball can be made so as to be acceptable or pleasing to the user. This in turn restricts the minimum height dimensions of the control device. Similar considerations apply to attempts to reduce the height of a mouse.

DISCLOSURE OF INVENTION

With the problem in mind of reducing the height of a ball-type device or mouse for controlling a position indicator on a visual display, while maintaining an exposed part-spheroidal portion of a size and curvature that are comfortable for the user, the present invention provides a device as initially defined for controlling cursor position on a display screen, characterised by said position controller comprising a control element made of elastomeric material and held in a deformed state between spaced-apart side portions of the housing so as to provide said part-spheroidal portion of said position controller and to have a height dimension, along the direction in which the two side portions of the housing are spaced-apart, less than twice the radius of curvature of said centre-most exposed region of said part-spheroidal portion.

The term "part-spheroidal" as used herein means that the exposed portion of the input device has a shape corresponding with a cap of a sphere or with a cap of a sphere-like body whose shape is similar to that of a sphere but is not precisely spherical.

In addition, "elastomeric" as used herein to refer to the material of which the indicator position controller that is held in a deformed state is made, refers to the unique properties of deformation (elongation or yield under strain) and elastic recovery to its original shape when it is no longer held in its deformed state. It will be appreciated that the choice of elastomeric material, depending on the embodiment concerned, is critical for satisfactory operation.

It will be appreciated that with such an indicator position controller, in particular the deformed state in which the elastomeric control element of the position controller is held, its height dimension can be reduced and yet the exposed part-spheroidal portion will appear to be substantially the same as for that of a conventional ball-type device having a spherical track-ball of substantially the same radius of curvature.

In a preferred embodiment, the control element of elastomeric material is a continuous thin-walled envelope (e.g. a membrane) stretched around a form-keeping core to hold the thin-walled envelope in its deformed shape and is able to slide on the core to enable the user to rotate the part-spheroidal portion of the position indicator controller around the centre of curvature of the centre-most exposed region of the part-spheroidal portion.

Since the function of the form-keeping core is to maintain the continuous thin-walled envelope of elastomeric material in a predetermined shape, it can be made of any suitable material that is substantially undeformable. The material should also have the property of having a smooth surface so as to minimize frictional resistance to the sliding movement of the thin-walled envelope. Suitable materials for the core are polyvinyl chloride (PVC), Phenoplast (Registered Trade Mark), or metal.

The material from which the envelope is made needs careful selection, also from the standpoint that it needs to have high stretchability to conform to the outer surface contours of the form-keeping core without wrinkling or at least with minimal wrinkling, and also be capable of sliding as a whole around the form-keeping core when a lateral displacement force is applied to the exposed part-spheroidal surface of the input element. The envelope material must also be substantially tear-free, over a sufficiently long operating life. It must also offer low frictional resistance, through suitably small membrane thickness and minimal surface roughness. Suitably, the continuous thin-walled envelope may be made from natural or synthetic caoutchouc or rubber, or a vinyl polymer, but these are examples and there are numerous other elastomeric materials, which will be readily identified by the man skilled in the art, which have the required properties described above.

Because of the importance of minimizing frictional resistance between the elastomeric envelope and the form-keeping core, preferably a lubricant is introduced between the elastomeric envelope and form-keeping core so as to form a lubricating film between the outside of the form-keeping core and the inside of the continuous thin-walled envelope.

A further drawback of a conventional ball-type input device is that when the cursor or pointer is positioned at the required location on the screen to select an indicated option or to anchor the cursor or pointer there, the appropriate command is made using an ENTER key that is separate from the ball-type input device and can for example be the ENTER key on the keyboard. It would be desirable for the ENTER command to be generated from the ball-type input device itself.

With this objective in mind, according to a preferred embodiment of the invention a push member is freely mounted in a passageway extending through the form-keeping core from behind the centre-most exposed region of the exposed part-spheroidal portion, substantially in the direction in which the two side portions of the housing are spaced-apart, and a switch is mounted in the said housing to produce an output signal in response to the push member actuating the switch when pressure is applied to the exposed part-spheroidal portion of the indicator position controller. The output signal is used to effect the conventional "ENTER" function.

In another arrangement, the indicator position controller is a thick-walled normally (i.e. when undeformed) spheroidal element of elastomeric material held in the deformed state by the side portions of the housing. Again, the elastomeric material can be natural or synthetic caoutchouc or rubber, or a vinyl polymer, for example. The wall thickness needs to be sufficient such that the exposed part-spheroidal portion of the indicator position controller maintains its spheroidal shape unassisted. This embodiment has the advantage of constructional simplicity since the indicator position controller is made of a single component. It is also cheap to realize.

In another embodiment, the indicator position controller is a normally (i.e. when undeformed) spheroidal solid mass of elastomeric material, which can be the same as in the preceding embodiment, held in said deformed state by the side portions of said housing. Again, this embodiment offers the advantage of constructional simplicity, since the input device is a single element. It is also cheap because it is simply a spheroidal solid mass of elastomeric material, such as an elastomeric ball. Furthermore, it is constructionally simple to arrange portions of the housing so as to hold the elastomeric ball in its required deformed state.

Whether the input element is a normally spheroidal solid mass of elastomeric material or a thick-walled spheroidal element, preferably the housing defines a circular opening in one of the side portions of said housing, through which said part-spheroidal portion of said indicator position controller protrudes, the controller being held in the deformed state between the edge of said circular opening in the one side portion of the housing and the inside surface of the other side portion of the housing. This represents a constructionally simple and effective way of holding the indicator position controller in its deformed state.

It may be difficult or impossible to use the position indicator controlling devices described above when the visual conditions deteriorate, i.e. when a user does not have clear view of the screen. This can for example be the case when using a portable electronic device outside in direct sunlight. This is also the case if the user is partially-sighted or blind. Whereas keyboards and push button arrays can often be used by the blind, e.g. simply by virtue of the fact that a desired command can be executed by pushing a key in a known position a predetermined number of times, rotating ball type input devices are generally not suited for use by a partially-sighted user, a blind person or a user working in conditions of poor light.

According, then, to a development, the position indicator controlling device includes means for providing the user with a sensory and/or audible indication of the extent of rotation of the continuous thin-walled envelope about the form-keeping core. In this way, the user can determine the position of the cursor on the display screen, even if he cannot see it properly or at all.

In a preferred embodiment of the kind defined above having a continuous thin-walled envelope fitted around a form-keeping core, the indication providing means comprises a plurality of cavities in the envelope and a ball biased towards the envelope so as to be brought into snap-in engagement with successive cavities as the envelope rotates about the form-keeping core.

As a result, the user does not have to exclusively rely on watching a cursor or pointer on a screen when operating the position indicator controlling device because of the audible or sensory indications provided, the input device is simple in construction and it may easily be miniaturized.

The position indicator controlling devices disclosed herein are especially intended for use with a laptop computer, where the indicator position controller has its exposed part-spheroidal portion protruding from an upper side of the housing. However, it will be appreciated that the position indicator control device can also be designed as a mouse for a personal computer or the like, where the exposed part-spheroidal portion protrudes from the underside of the mouse for frictional contact with a ground surface, e.g. mouse mat, and the overall height of the mouse is reduced as compared with a conventional mouse having a spherical group-engaging ball whose radius of curvature is the same as that of the part-spheroidal portion of the novel mouse.

DESCRIPTION OF FIGURES

For a better understanding of the invention and to show how the same may be carried into effect, reference will now be made, by way of example, to the accompanying drawings, in which:

FIG. 5 is a vertical sectional view similar to FIG. 4 of a second embodiment;

FIG. 6 is a vertical sectional view, again similar to FIG. 4, of a third embodiment;

DETAILED DESCRIPTION OF EMBODIMENTS

Figure 1:
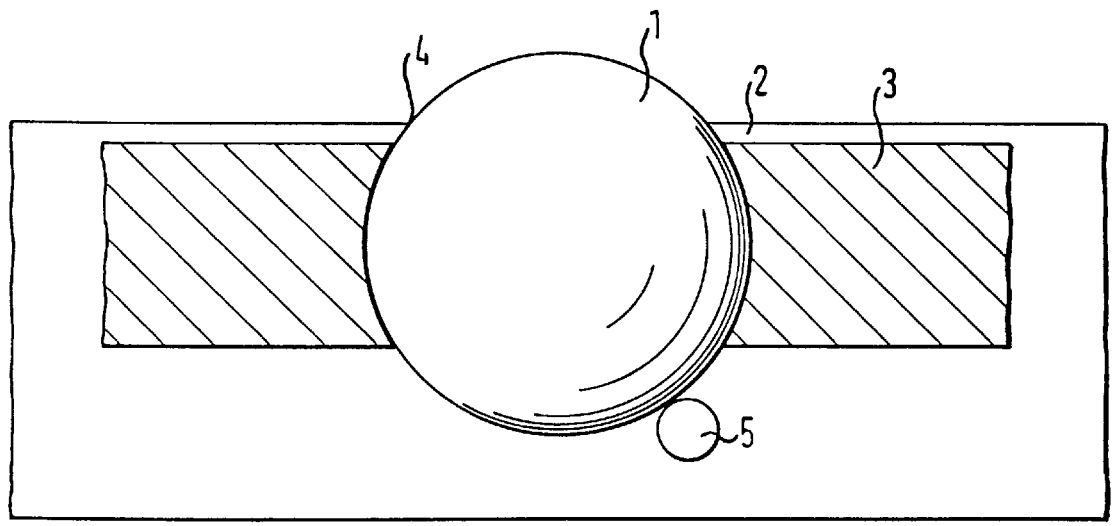
FIG. 1, which has already been described, is a diagrammatic vertical sectional view through a typical track-ball for controlling a position indicator on a display screen.
Figure 2:
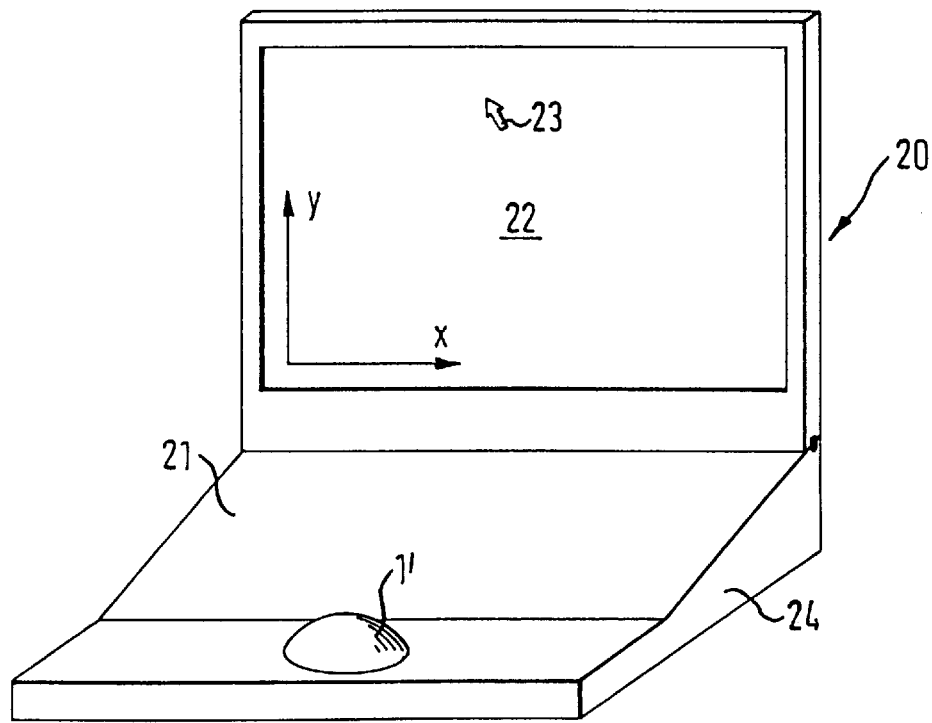
FIG. 2 is a diagrammatic perspective view of a laptop computer incorporating one form of position indicator controlling device in accordance with the invention.

Referring to FIG. 2, there is shown a diagrammatic perspective view of a laptop computer 20 having a main body 24, a keyboard 21, a display screen 22 forming a lid for the main body, and a position indicator controlling device 1' mounted in the centre of a forward portion of the main body 24 for controlling the position of a cursor 23 on the screen so that, for example, it becomes coincident with a menu option, item of alphanumeric text, or the like for which a command is to be input to the laptop computer.

Figure 3:
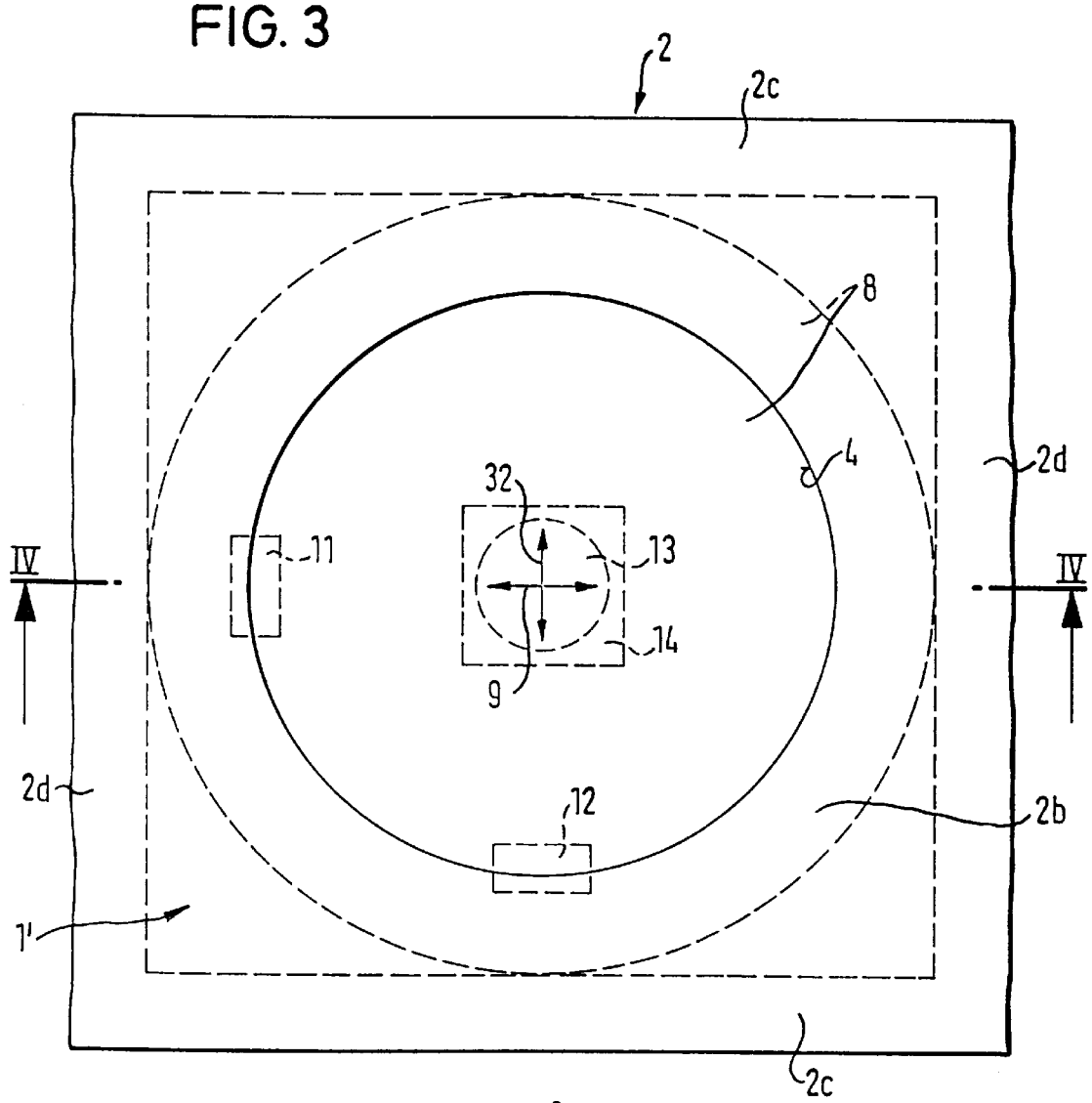
FIG. 3 is a plan view of a first embodiment of the invention.
Figure 4:
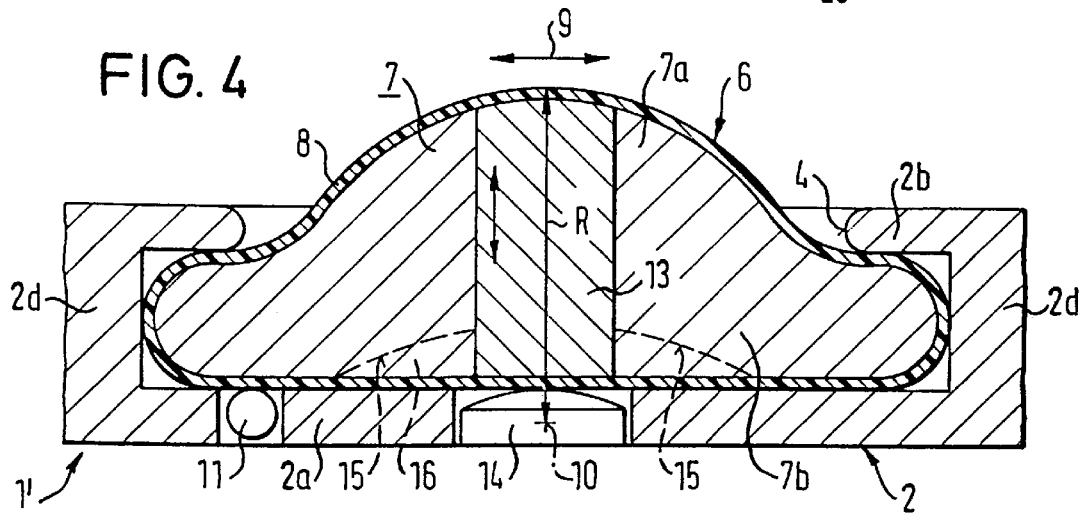
FIG. 4 is a vertical sectional view through FIG. 2, taken along the line IV—IV.

Referring now to the first embodiment shown in FIGS. 3 and 4, the construction of the position indicator controlling device 1' is shown in more detail. The device can be an integral part of the laptop computer or it can be a separate unit, secured in an appropriate manner to the laptop computer body.

In FIGS. 3 and 4, there is shown a housing 2 comprising an underside or bottom wall 2a, an upperside or top wall 2b, opposite side walls 2c and end walls 2d. The housing is of generally box-like shape.

Mounted within the housing 2 is an indicator position controller 6 comprising a form-keeping core 7 with a continuous thin-walled envelope or membrane 8 of elastomeric material stretched around the outer surfaces of the core 7 so as to assume its shape in substantially wrinkle-free manner. Preferably, as shown, the form-keeping core is shaped as a body of revolution about a vertical axis passing through the centre of the form-keeping core and comprises an upper part-spheroidal portion 7a and a lower disc-like portion 7b. The top wall 2b is formed with a central circular opening 4 through which the upper part-spheroidal portion 7a of the form-keeping core 7 with the thin-walled membrane 8 stretched over it protrude, so as to be exposed to the user. The lower disc-like portion has its outer peripheral portion located underneath the inner rim portion of the top wall 2b, so as to hold the form-keeping core 7 and continuous membrane 8 captive in the housing 2. The indicator position controller 6 is a free fit within the housing with a small gap between the outer peripheral surface of the portion of the thin-walled membrane 8 that passes around the circumferential surface of the lower disc-like portion 7b of the form-keeping core 7, such that the membrane 8 can slide on the underlying surface of the core without unnecessary frictional resistance but lateral displacement of the form-keeping core 7 is substantially prevented.

When finger or hand contact pressure is applied to the top of the indicator position controller 6 in a direction, such as indicated by the double arrow 9, the continuous membrane 8 slides on the outer surface of the form-keeping core 7. Lateral movement of the membrane 8 due to rotation of the portion of the membrane on the part-spheroidal portion of the indicator position controller about the centre of curvature 10 of the centre-most region of the part-spheroidal portion 7a, is detected by motion detector 11, shown very diagrammatically in FIGS. 2 and 3. This motion detector can take the form of a roller that is in frictional contact with the membrane 8 and a transducer for producing an electrical output signal in dependence on the roller rotation. This output signal is used as an input signal to the laptop computer to control motion of the cursor 23 in the x-axis direction of the display screen 22 (see FIG. 2).

Similarly, movement of the membrane in the direction of the double arrow 32, that is at right angles to the double arrow 9 in the plan view of FIG. 3 is detected by a y-motion detector 12 and converted into a corresponding output signal that controls the movement of the cursor 23 in the y-axis of the display screen 22. Motion of the input member in any other direction at an angle to directions 9 and 32 will simultaneously produce output signals corresponding to motion of the cursor 23 along an inclined path on the screen having components along the x and y axes, i.e. at an angle to them. In this way, the position of the cursor 23 can be adjusted to any desired location on the screen.

Preferably, as shown, a vertical passageway extends from the top of the form-keeping core to its underside and a push member 13 is slidably mounted in the passageway. The upper end of the push member has a part-spheroidal contour that matches that of, and forms a continuous surface with, the upper part-spheroidal surface of the upper portion 7a of the form-keeping core 7. The lower end of the slider is a plane surface that is coincident with the flat underside of the form-keeping core.

Located in an aperture in the underside wall 2a of the housing 2 is a switch 14, diagrammatically shown in FIG. 3, whose upper surface is located beneath the lower end of the push member 13 with the membrane 8 interpositioned between the push member and switch. When the user applies finger pressure to the top of the indicator position controller 6, pressure is transmitted by the push-member 13 to the switch, which accordingly produces an output signal that functions as an "ENTER" signal to the laptop computer. In this way, an ENTER command can be sent to the computer without having to use the ENTER key on the keyboard.

In order to reduce the resistance to the sliding movement of the continuous membrane 8 on the form-keeping core 7, lubricant may be provided between the membrane and the core, to form a friction-reducing lubricating film. Any suitable lubricant such as is well known to the skilled person may be used for this purpose. The lubricant can be a liquid lubricant such as oil, or a non-liquid lubricant such as graphite or talc powder.

Two different methods of fabricating a core covered with a membrane will now be described. The first one applies both to core types which incorporate a passageway with a push member 13 therein and an associated switch (to enable an "ENTER" signal to be inputted from the device) and to solid core types (where the "ENTER" command is produced using the keyboard ENTER key). In this latter case, the core is already in its final shape and already-fabricated. The second method applies only to solid type cores that are finally shaped inside the membrane during the fabrication process, as will be described below.

According to the first fabrication method, a membrane of elastomeric material shaped like a hollow ball has an opening (e.g. a straight line slit) formed in its wall. For reasons which will become apparent below, the elastomeric material is chosen to have a temperature dependent elasticity modulus such that on reducing the temperature, the membrane becomes solid. After inserting lubricant into the membrane through the opening, the form-keeping core is inserted through the opening into the membrane. The opening is then closed by pulling the sides of the opening together with the aid of a suitable mechanical device and the joining areas are permanently connected by means of glue, vulcanization or welding. It should be noted that the whole fabrication described so far is effected under reduced pressure.

Once the opening is permanently closed, normal air pressure is restored. Normal air pressure leads to a reduced air volume inside the membrane by the mechanism of compression. The membrane now assumes the external contours of the core automatically, even though the core and membrane are not held in a mechanical fixing. The process may be carried out under normal air pressure instead but then the membrane has to be physically constrained to follow the contours of the core with the aid of a suitable mechanical fixing.

The remaining air volume trapped between core and membrane ensures distribution of the lubricant, thus leading to a low frictional force. Depending on how the opening has been permanently sealed, the membrane surface may reveal a join seam. This may restrict proper operation of the position indicator controlling device and/or may not lead to a preferred appearance, i.e. a continuous closed envelope with a uniform surface. In order to remove the seam or other protrusions resulting from the fabrication, the air pressure is increased to press (and fix) the membrane tightly onto the core. Then, by reducing the ambient temperature substantially, the elasticity of the membrane is lowered. With sufficient ambient temperature reduction, the membrane becomes solid. Now, the surface can be polished i.e. protrusions can be removed easily. In a slightly modified fabrication process, instead of using a complete membrane with a small opening in its wall, two half membranes can be used for fitting the membrane around the core.

In accordance with the second fabrication method referred to above, in a first step, a completely closed, normally spheroidal, membrane (hollow ball) has to be fabricated. This can be done in the following way. A mould having a perfect spherical shape is filled with elastomer in its liquid phase and set into rotation about three initially perpendicular space coordinates. As a result, the elastomer is evenly distributed inside the mould. In the second step, the elastomer becomes hardened, i.e. transferred from the liquid phase to the elastomeric phase. In this way, a completely hollow sphere of elastomeric material is formed.

In the next step, a lubricant is injected into the membrane through its wall by means of a very thin needle. Again, the lubricant is evenly distributed inside the membrane by rotation of the membrane. Then, the membrane is taken out of the spherical mould and is put into a different mould having the final shape of the membrane on the core. Since the membrane is still filled with air, a perfect matching of the membrane to the mould contours can be achieved with properly adjusted air pressure in the mould.

Next, the complete volume of the space inside the ball is filled with core material in the liquid phase by means of two thin needles passing through the wall of the membrane. One needle is used to inject the core material and the second needle allows displaced air inside the membrane to leave. The lubricant already injected and evenly distributed inside the membrane prevents the core material from adhering to the membrane. Since the membrane is made of elastomeric material, no openings are left in the membrane wall once the needles are withdrawn. Depending on the nature of the core material used, the liquid phase is transferred to solid phase such as by a self-starting chemical process or by applied heat.

After the core is completely hardened, normal air pressure is restored and the core with membrane covering it is removed from the mould.

According to a modification, the bottom surface of the core 7 in the FIGS. 3 and 4 embodiment may be concave as indicated by dotted line 15 (FIG. 4, as well as FIGS. 9 and 10 to be described below), so as to form an air reservoir 16 between the membrane and core. The provision of this reservoir is advantageous when fitting the membrane around the core according to the first fabricating method described above, in that air which is not removed from between the membrane and core by compression when the air pressure is restored is collected in the air reservoir instead of creating unwanted air bubbles between the core and membrane.

Figure 7:
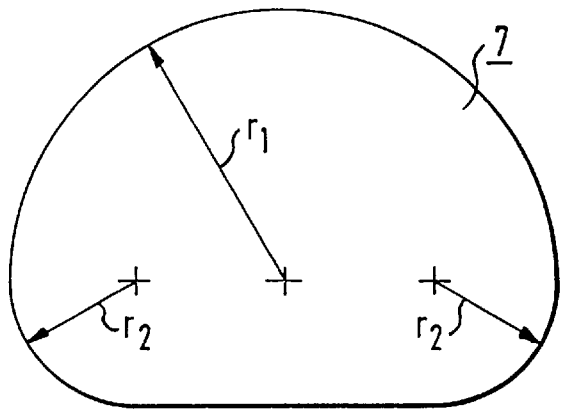
FIGS. 7 and 8 show modifications to the shape of the form-keeping core of the device shown in FIG. 4.
Figure 8:
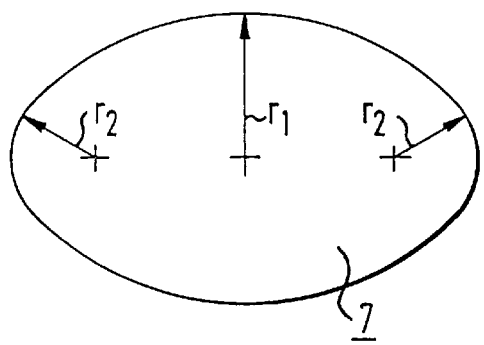

As one example of a modified core shape for the embodiment according to FIGS. 3 and 4, the core may be a body of revolution having an elliptical shape in vertical section (FIG. 7). Alternatively, the vertical sectional shape may be defined by an upper semicircular arc, a bottom straight line and two arcs of smaller radius of curvature than that of the semicircular arc, each connecting a respective end of the bottom line to a respective end of the neighbouring semicircular arc (FIG. 8). It will be noted that the core shapes according to FIGS. 7 and 8 do not have any concave surface portions, unlike the core shape according to FIG. 4.

Figure 9A:
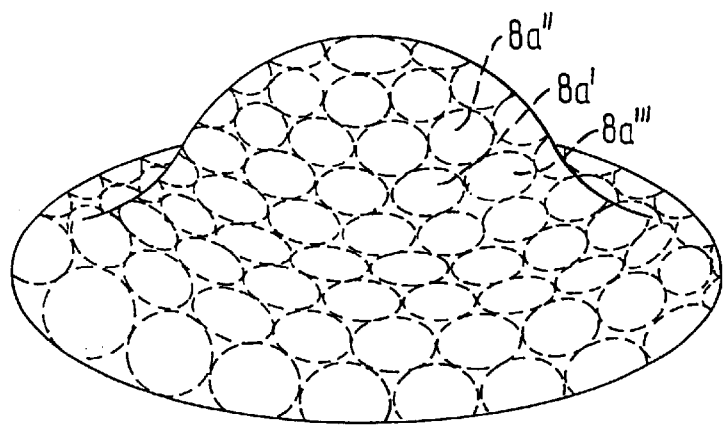
FIG. 9A is a perspective view of the membrane of the FIG. 9 embodiment in position on its form-keeping core, showing one possible arrangement of apertures formed in the inner surface of the membrane and used for giving sensory and/or audible indication to a user of the extent of angular rotation of the membrane on the core.
Figure 9:
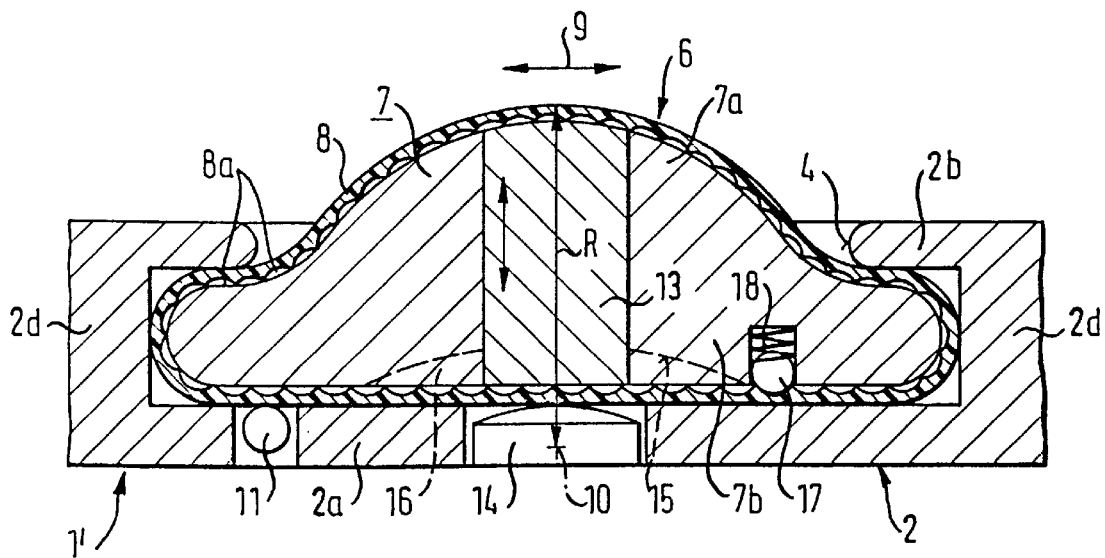

The position indicator device according to FIG. 9 is of the same basic construction as that described with reference to FIGS. 3 and 4 but incorporates a modification such that it can be used in poor visual conditions, such as in direct sunlight or when the user is blind.

As shown in FIG. 9, which is a vertical sectional view through the core 7 about its vertical axis, and the perspective view of FIG. 9A (in which the housing 2 is omitted), the inside surface of the membrane 8 is formed with an array of small cavities or indentations 8a. The membrane wall thickness needs to be larger than in the previously disclosed embodiments, in order that it can accommodate the small cavities within its thickness. These cavities preferably form an array of contiguous cavities arranged with their centres at substantially equal spacings around the inner periphery of the membrane 8. Thus the centres of any three adjacent cavities, such as the cavities 8a', 8a" and 8a'" in FIG. 9A, are located at the apexes of an equilateral triangle. A ball 17 slidably mounted in a vertical bore extending upwardly in the core 7 from its underside surface is biased by a spring 18 towards the adjacent inner surface portion of the membrane.

As the membrane 8 is progressively rotated by the operator around the core 7 in any direction, the ball snaps into, and is forced out of, successive cavities 8a. Each time this happens, the user can feel with his hand the resulting change in the force opposing the rotation of the membrane. By counting these successive sensations, the user can determine the extent of angular rotation of the membrane in the direction concerned and hence the end position of the cursor on the display screen. When the user releases hand contact from the membrane, the membrane will tend to adjust its position, if need be, so that the ball 17 becomes located in the centre of a cavity 8a.

If the user rotates the membrane in a direction that does not align with or is offset from a direction in which the cavities are aligned, the sensory indications will start to change as the ball 17 starts to move off-centre relative to the apertures 8a. Alternatively, if the ball has limited freedom to be displaced laterally relative to the direction in which the membrane is displaced, a small lateral jitter will be imposed on the ball as it is displaced alternately in opposite lateral directions. In this way, the user can immediately recognize that he is rotating the membrane at an angle to any of the directions in which the cavities are aligned.

Depending on the properties of the material chosen to form the membrane, the snap-in action each time may also produce an audible click or noise, to supplement the sensation that can be felt by the operator. Alternatively, the design may be such that a clear audible click or noise if given, but there is no or negligible sensation imparted to the user. It is generally preferred however that both sensory and audible indications are given.

It will be appreciated that because the membrane 8 is held in a stretched condition around the core 7 so that it conforms to the external contours of the core, the spacing between adjacent aperture centres will vary slightly according to the different instantaneous aperture positions about the core and the changing position of each aperture as the membrane is rotated. However, it is considered that the differences in aperture spacings are small and have minimal effect on the final position of the cursor on the screen as detected by the user, relative to the corresponding actual cursor position.

The described arrangement of the apertures in the membrane is a preferred one, but other arrangements are possible. For example, in the interests of economy of manufacture, fewer apertures may be provided with a spacing between each aperture and the next adjacent one. However, such an arrangement will result in fewer clicks and a less clear indication to the operator as to the position of the cursor on the screen.

Figure 10:
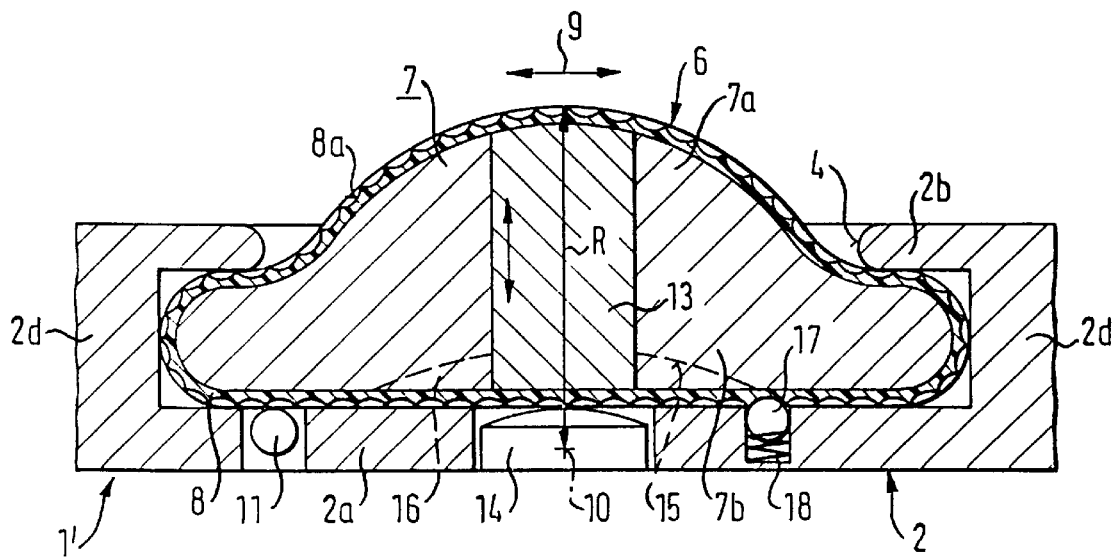
FIGS. 9 and 10 show two further embodiments of the invention, intended for use in poor visual conditions.

In FIG. 10, the cavities 8a are formed instead in the outer surface of the membrane and the ball 17 and its associated spring 18 are fitted inside a bore in the underside wall 2a of the housing 2, such that the ball snaps into successive cavities as the membrane is rotated on the core 7. In other respects, the construction and operation are the same as in the FIGS. 9, 9A embodiment.

Fabrication of the membrane/core assembly can be done according to either of the two fabrication techniques as described for the FIGS. 3 and 4 embodiment. It will be appreciated that the membrane will have to be made thicker, in view of the need to accommodate the cavities formed in the membrane wall.

In the modification according to FIG. 5, instead of an indicator position controller comprising the continuous elastomeric membrane around the form-keeping core, the input element comprises a relatively thick-walled spheroidal-shaped element 8' of elastomeric material, for example a thick-walled rubber ball, which is held in a deformed state between the upper flat surface of the bottom wall 2a of the housing and the inner peripheral edge portion 2b of the top wall. The portion of the spheroidal-shaped element 8' spanning the central opening in the top wall 2b tends to bow upwardly and thereby protrude through the opening in the housing, to provide a convex, part-spheroidal, exposed surface portion. It will be appreciated that the wall thickness of the thick-walled element 8' needs to be carefully chosen in order that it has sufficient stiffness to bow upwardly into a part-spheroidal shape but at the same time be capable of bending around a fairly tight curve along the outer edge of the deformed spheroidal-shaped member.

According to a further development as shown in FIG. 6, the input member is a normally spheroidal (i.e. when undeformed) solid mass 8" of elastomeric material, again held in its deformed state by the corresponding portions of the housing as in the case of the embodiment according to FIG. 5. Again, the nature of the elastomeric material must be carefully chosen so that the upwardly protruding portion of the indicator position controller assumes the required part-spheroidal shape and so that the exposed portion can be rotated about its centre of curvature without undue frictional resistance.

It will be appreciated that the described devices for controlling the position indicator, such as cursor or pointer, on the display screen are of simple and cheap construction. Furthermore, because the indicator position controller in each embodiment is to have a height dimension that is less than twice the radius of curvature R of the centre-most region of the part-spheroidal portion, it offers a ball-type input device of lower height than for a device with a spherical track-ball having the same curvature (it being noted that a spherical track-ball has a height dimension of 2R). In fact, in the embodiments according to FIG. 3, the height of the indicator position controller 6 is, as the Figure clearly shows, slightly less than the radius of curvature R of the centre-most region of the exposed part-spheroidal portion, which represents a very compact arrangement indeed, heightwise.

The described embodiments are merely examples of preferred ways for putting the invention into effect. It will be appreciated that the precise shape of the form-keeping core in the FIGS. 3 and 4 embodiment and the precise shapes of the deformed thick-walled elastomeric ball and solid ball according to FIGS. 5 and 6, respectively, are of no particular significance, providing the height dimension is less than twice the radius of curvature R of the centre-most region of the part-spheroidal portion of the indicator position controller. In general, however, the indicator position controller will have an extended width commensurate with its reduced height.

Additionally, the number, arrangement and type of the motion detectors 11, 12 is of no particular significance. The disclosed 90° angular relative displacement and orientation of the two motion detectors about the vertical axis is preferred but not essential. When a different angle from 90° is chosen, the output signals have to be corrected in order to convert them to signals based on a rectangular coordinate system. Although roller-type detectors have been specifically mentioned, other types such as optical detectors can be used instead.

The described embodiments relate to ball-type input devices, but it will be appreciated that they find ready application to a mouse, which would have the same constructional features but be used, effectively in an inverted position.

Although it is preferred that the described control devices are to be used with laptop computers, they can also be used for other applications where a position indicator is to be controlled on a visual display, e.g. a pointer on a visual display unit whose image is projected onto a screen for viewing by an audience.

What is claimed is:

1. A device for controlling a position indicator on a visual display, comprising a housing, an indicator position controller held captive in the housing so as to expose a part-spheroidal portion of the position controller for enabling a user to rotate the same substantially about the center of curvature of the center-most exposed region of the part-spheroidal portion, and detector means for providing output signals dependent on the rotation of the part-spheroidal portion, said position controller including a control element made of elastometric material and held at a peripheral portion in a deformed state between spaced-apart upper and lower portions of the housing so as to provide said part-spheroidal portion of said position controller and to have a height dimension, along the direction in which the upper and lower portions of the housing are spaced-apart, less than twice the radius of curvature of said center-most exposed region of said part-spheroidal portion.

2. A device according to claim 1, wherein said control element of elastomeric material is a continuous thin-walled envelope stretched around a form-keeping core to hold said thin-walled envelope in its deformed shape and is able to slide on said core to enable the user to rotate the part-spheroidal portion about said center of curvature.

3. A device according to claim 2, wherein there is a lubricant between the outside of the form-keeping core and the inside of the continuous thin-walled envelope.

4. A device according to claim 2, wherein a push member is freely mounted in a passageway extending through said form-keeping core from behind said center-most exposed region of the exposed part-spheroidal portion, substantially in the direction in which the upper and lower portions of the housing are spaced-apart, and a switch is mounted in said housing to produce an output signal in response to the push member actuating the switch when pressure is applied to the exposed part-spheroidal portion of the indicator position controller.

5. A device according to claim 2, wherein the form-keeping core is a body of revolution about a vertical axis having an elliptical vertical cross-sectional shape.

6. A device according to claim 2, wherein the form-keeping core is a body of revolution about a vertical axis having a vertical cross-sectional shape defined by an upper semicircular arc, a bottom straight line and two areas of smaller radius of curvature than that of the semicircular arc, each connecting a respective end of the bottom line to a respective end of the semicircular arc.

7. A device according to claim 2, wherein the underside of the form-keeping core is concave to define an air reservoir between the core and thin-walled envelope.

8. A device according to claim 2, comprising means for providing the user with a sensory and/or audible indication of the extent of rotation of the continuous thin-walled envelope about the form-keeping core.

9. A device according to claim 8, wherein said sensory and/or audible-indication providing means comprises a plurality of cavities in said continuous thin-walled envelope and a ball biased towards said envelope so as to snap-in to successive cavities as the envelope rotates about the form-keeping core.

10. A device according to claim 1, which is a ball-type device whose part-spheroidal portion is for rotation by a user's hand or finger.

11. A device according to claim 1, which is a mouse whose part-spheroidal portion is for frictional contact with a ground surface.

12. A device for controlling a position indicator on a visual display, comprising a housing, an indicator position controller held captive in the housing so as to expose a part-spheroidal portion of the position controller for enabling a user to rotate the same substantially about the center of curvature of the center-most exposed region of the part-spheroidal portion, and detector means for providing output signals dependent on the rotation of the part-spheroidal portion, said position controller being a thick-walled, normally spheroidal element of elastomeric material and held at a peripheral portion in a deformed state between spaced-apart upper and lower portions of the housing so as to provide said part-spheroidal portion of said position controller and to have a height dimension, along the direction in which the upper and lower portions of the housing are spaced-apart, less than twice the radius of curvature of said center-most exposed region of said part-spheroidal portion.

13. A device according to claim 12, wherein said position controller is a body of revolution about a vertical axis having an elliptical vertical cross-sectional shape.

14. A device according to claim 12, wherein said position controller is a body of revolution about a vertical axis having a vertical cross-sectional shape defined by an upper semicircular arc, a bottom straight line and two areas of smaller radius of curvature than that of the semicircular arc, each connecting a respective end of the bottom line to a respective end of the semicircular arc.

15. A device according to claim 12, wherein the underside of said position controller is concave to define an air reservoir between the core and thin-walled envelope.

16. A device according to claim 12, wherein said housing defines a circular opening in one of the upper and lower portions of said housing, through which said part-spheroidal portion of said indicator position controller protrudes, said controller being held in said deformed state between the edge of said circular opening in said one side portion of the housing and the inside surface of the other of the upper and lower portions of said housing.

17. A device according to claim 12, which is a ball-type device whose part-spheroidal portion is for rotation by a user's hand or finger.

18. A device according to claim 12, which is a mouse whose part-spheroidal portion is for frictional contact with a ground surface.

19. A device for controlling a position indicator on a visual display, comprising a housing, an indicator position controller held captive in the housing so as to expose a part-spheroidal portion of the position controller for enabling a user to rotate the same substantially about the center of curvature of the center-most exposed region of the part-spheroidal portion, and detector means for providing output signals dependent on the rotation of the part-spheroidal portion, said position controller being a normally spheroidal solid mass of elastomeric material and held at a peripheral portion in a deformed state between spaced-apart upper and lower portions of the housing so as to provide said part-spheroidal portion of said position controller and to have a height dimension, along the direction in which the upper and lower portions of the housing are spaced-apart, less than twice the radius of curvature of said center-most exposed region of said part-spheroidal portion.

20. A device according to claim 19, wherein said position controller is a body of revolution about a vertical axis having an elliptical vertical cross-sectional shape.

21. A device according to claim 19, wherein position controller is a body of revolution about a vertical axis having a vertical cross-sectional shape defined by an upper semicircular arc, a bottom straight line and two areas of smaller radius of curvature than that of the semicircular arc, each connecting a respective end of the bottom line to a respective end of the semicircular arc.

22. A device according to claim 19, wherein the underside of said position controller is concave to define an air reservoir between the core and thin-walled envelope.

23. A device according to claim 19, wherein said housing defines a circular opening in one of the upper and lower portions of said housing, through which said part-spheroidal portion of said indicator position controller protrudes, said controller being held in said deformed state between the edge of said circular opening in said one side portion of the housing and the inside surface of the other of the upper and lower portions of said housing.

24. A device according to claim 19, which is a ball-type device whose part-spheroidal portion is for rotation by a user's hand or finger.

25. A device according to claim 19, which is a mouse whose part-spheroidal portion is for frictional contact with a ground surface.

26. A device for controlling a position indicator on a visual display, comprising:
 a housing having an upper portion and a lower portion; and
 an indicator position controller having a first portion and a second portion,
  wherein the first portion has a part-spheroidal shape with a center and radius of curvature and a height, and is located substantially external to the housing, and
  wherein the second portion has a circular shape and a height, is located at its extremities between the upper and lower portion of the housing, and supports the first portion;
 a control element surrounding at least one portion of said position controller; and
 a detector for providing output signals dependent on user input to the position controller.

27. The device according to claim 26, wherein the height of the second portion is less than twice the radius of curvature of the external part of the first portion.

28. The device according to claim 26, wherein a diameter of the circular shape of the second portion is larger than the height of the first portion.

29. The device according to claim 26, wherein the position controller is rotatable about a center of curvature of the external part of the first portion.

30. The device according to claim 26, wherein the control element is made of elastometric material.

31. The device according to claim 26, wherein the detector outputs signals dependent on the rotation of the first portion of the position controller.

* * * * *